United States Patent
Kim

(10) Patent No.: US 11,499,038 B2
(45) Date of Patent: Nov. 15, 2022

(54) TREAD COMPOSITION AND TIRE PRODUCED BY USING THE SAME

(71) Applicant: Bridgestone Corporation, Chuo-ku (JP)

(72) Inventor: Hyeonjae Kim, Copley, OH (US)

(73) Assignee: Bridgestone Corporation, Chuo-ku (JP)

(*) Notice: Subject to any disclaimer, the term of this patent is extended or adjusted under 35 U.S.C. 154(b) by 263 days.

(21) Appl. No.: 16/958,465

(22) PCT Filed: Dec. 20, 2018

(86) PCT No.: PCT/US2018/066745
§ 371 (c)(1),
(2) Date: Jun. 26, 2020

(87) PCT Pub. No.: WO2019/133429
PCT Pub. Date: Jul. 4, 2019

(65) Prior Publication Data
US 2021/0054176 A1    Feb. 25, 2021

Related U.S. Application Data

(60) Provisional application No. 62/610,440, filed on Dec. 26, 2017.

(51) Int. Cl.
*C08L 9/06* (2006.01)

(52) U.S. Cl.
CPC ............. *C08L 9/06* (2013.01); *C08L 2205/03* (2013.01)

(58) Field of Classification Search
CPC ......... C08L 47/00; C08L 9/06; C08L 2205/03
See application file for complete search history.

(56) References Cited

U.S. PATENT DOCUMENTS

| | | | |
|---|---|---|---|
| 6,472,464 B1 | 10/2002 | Morita | |
| 7,084,228 B2 | 8/2006 | Labauze et al. | |
| 7,882,874 B2 | 2/2011 | Robert et al. | |
| 8,178,605 B2 | 5/2012 | Lopitaux et al. | |
| 8,637,606 B2 | 1/2014 | Pille-Wolf et al. | |
| 8,993,664 B2 | 3/2015 | Miyazaki | |
| 9,034,980 B2 | 5/2015 | Recker et al. | |
| 9,260,600 B2 | 2/2016 | Takeda | |
| 9,284,439 B2 | 3/2016 | Takeda | |
| 9,290,644 B2 | 3/2016 | Sato et al. | |
| 2003/0100660 A1* | 5/2003 | Zanzig | C08L 9/00 524/495 |
| 2011/0048599 A1 | 3/2011 | Ryba et al. | |
| 2012/0077902 A1 | 3/2012 | Steiner et al. | |
| 2013/0237659 A1 | 9/2013 | Recker et al. | |
| 2014/0107286 A1 | 4/2014 | Hamann et al. | |
| 2014/0256847 A1 | 9/2014 | Sato et al. | |
| 2015/0126643 A1 | 5/2015 | Satou et al. | |
| 2015/0148447 A1 | 5/2015 | Takeda | |
| 2017/0232795 A1 | 8/2017 | Isitman et al. | |

FOREIGN PATENT DOCUMENTS

| | | |
|---|---|---|
| EP | 0254766 A1 | 2/1988 |
| EP | 1308317 A1 | 5/2003 |
| JP | H09316132 A | 12/1997 |
| JP | 2016094552 A | 5/2016 |
| WO | 2006061064 A1 | 6/2006 |
| WO | 2013176712 A1 | 11/2013 |
| WO | 2016104144 A1 | 6/2016 |

OTHER PUBLICATIONS

Carvagno, et al.; Performance resins in tire compounding, The Technical Service Magazine for the Rubber Industry, Feb. 2014; vol. 249, No. 5.
International Search Report and Written Opinion issued in the previously filed International Application No. PCT/US2018/066745; dated Apr. 15, 2019.

* cited by examiner

*Primary Examiner* — Jeffrey C Mullis
(74) *Attorney, Agent, or Firm* — Meredith E. Hooker; J. Gregory Chrisman

(57) ABSTRACT

The present disclosure relates to a rubber composition that includes an aromatic-compound based resin and a styrene-butadiene copolymer and a tire using the same as the tread rubber or a component thereof. The rubber composition provides improved wet traction.

18 Claims, No Drawings

TREAD COMPOSITION AND TIRE PRODUCED BY USING THE SAME

This application is a national stage application of PCT/US2018/066745 filed on Dec. 20, 2018, which claims the benefit of U.S. Provisional Application Ser. No. 62/610,440 filed on Dec. 26, 2017, which are incorporated herein by reference in their entirety.

TECHNICAL FIELD

The present disclosure relates to a rubber composition that includes an aromatic-compound based resin and a styrene-butadiene copolymer and a tire using the same as the tread rubber or a component thereof. The rubber composition provides improved wet traction.

BACKGROUND

Wet traction is a property of rubber that has an impact on tire performance. Generally, as the amount of water on the road surface increases, traction decreases due to the reduction in contact between the tire and the road surface. As a result, there may be a decrease in handling and stopping distance.

Inorganic fillers, such as silica, impart improved wet traction and improved snow traction when used within tire treads. Mixing silica into a tire stock, however, is difficult because silica particles agglomerate and therefore they are not easily dispersed. The poor dispersing of silica in rubber may affect the wearing and lifespan of a tire. In response, processing and dispersing aids, such as processing oils, are used during compounding. Unfortunately, the use of these processing and dispersing aids may enhance a decrease in modulus that is typically observed at high temperatures.

Because better wet traction characteristics provide improved safety and stopping distance, there is a need to overcome the difficulties associated with the use of silica and processing oils in tire treads.

It is an objective of the present disclosure to alleviate or overcome one or more difficulties related to the prior art. It has been found that aromatic-compound based resins can be used in rubber compositions that include styrene-butadiene copolymers to provide enhanced wet traction.

SUMMARY

In a first aspect, disclosed is a rubber composition for a tire. The composition includes a rubber component, a styrene-butadiene copolymer that includes a total styrene content of 18 to 45 percent by weight of the styrene-butadiene copolymer and a content of styrene sequences having three or more styrene units greater than 8 weight percent of the styrene-butadiene copolymer, and 10 to 30 phr of an aromatic-compound based resin. The rubber composition has a tan $\delta$ of 0.4 to 0.8 measured at 0° C.

In an example of aspect 1, the aromatic-compound based resin is a coumarone indene resin.

In another example of aspect 1, the aromatic-compound based resin is an alkyl aromatic resin.

In another example of aspect 1, the total styrene content is 30 to 43 percent by weight of the styrene-butadiene copolymer.

In another example of aspect 1, the content of styrene sequences having three or more styrene units is 15 to 30 weight percent of the styrene-butadiene copolymer.

In another example of aspect 1, the rubber composition is substantially free of a process oil.

The first aspect may be provided alone or in combination with any one or more of the examples of the first aspect discussed above.

In a second aspect, there is a rubber composition for a tire. The composition includes a rubber component, a styrene-butadiene copolymer that includes a total styrene content of 18 to 45 percent by weight of the styrene-butadiene copolymer and a content of styrene sequences having three or more styrene units greater than 8 weight percent of the styrene-butadiene copolymer, and 15 to 25 phr of (i) a coumarone indene resin or (ii) an alkyl aromatic resin. The rubber composition has a tan $\delta$ of 0.4 to 0.8 measured at 0° C.

In an example of aspect 2, the total styrene content is 30 to 43 percent by weight of the styrene-butadiene copolymer.

In another example of aspect 2, the content of styrene sequences having three or more styrene units is 15 to 30 weight percent of the styrene-butadiene copolymer.

In another example of aspect 2, the rubber composition is substantially free of a process oil.

The second aspect may be provided alone or in combination with any one or more of the examples of the second aspect discussed above.

In a third aspect, there is a first rubber composition for a tire. The first rubber composition includes a rubber component, a styrene-butadiene copolymer that includes a total styrene content of 18 to 45 percent by weight of the styrene-butadiene copolymer, and 10 to 30 phr of an aromatic-compound based resin. The first rubber composition has a wet-traction index based on tan $\delta$ measured at 0° C. at least 20% greater than a wet-traction index based on tan $\delta$ measured at 0° C. of a second rubber composition having a substantially similar composition as the first rubber composition except the aromatic-compound based resin is replaced with a process oil.

In an example of aspect 3, the wet-traction index based on tan $\delta$ measured at 0° C. of the first rubber composition is at least 30% greater than the wet-traction index based on tan $\delta$ measured at 0° C. of the second rubber composition.

In another example of aspect 3, the wet-traction index based on tan $\delta$ measured at 0° C. of the first rubber composition is at least 40% greater than the wet-traction index based on tan $\delta$ measured at 0° C. of the second rubber composition.

In another example of aspect 3, the styrene-butadiene copolymer has a content of styrene sequences having three or more styrene units greater than 8 weight percent of the styrene-butadiene copolymer.

In another example of aspect 3, the aromatic-compound based resin is a coumarone indene resin.

In another example of aspect 3, the aromatic-compound based resin is an alkyl aromatic resin.

In another example of aspect 3, the total styrene content is 30 to 43 percent by weight of the styrene-butadiene copolymer.

In another example of aspect 3, the content of styrene sequences having three or more styrene units is 15 to 30 weight percent of the styrene-butadiene copolymer.

In another example of aspect 3, the process oil of the second rubber composition is a petroleum hydrocarbon mixture.

The third aspect may be provided alone or in combination with any one or more of the examples of the third aspect discussed above.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than 25. In an example, such a range defines independently at least 5, and separately and independently, not more than 25.

Unless specified otherwise, "phr" of an ingredient in a rubber composition means part by weight of the ingredient based on 100 parts by weight of total elastomers in the rubber composition. In an example, a rubber composition that has 5 phr of carbon black means that the rubber composition has 5 parts by weight of carbon black based on 100 parts by weight of elastomers present in the rubber composition.

The present disclosure relates to the use of aromatic-compound based resins in rubber compositions that include styrene-butadiene copolymers to enhance wet traction. In one or more embodiments, the aromatic-compound based resin is a full or partial oil replacement in the rubber compositions.

Embodiments disclosed herein relate to rubber compositions that include a rubber component, a styrene-butadiene copolymer, and an aromatic-compound based resin. In one embodiment, the rubber component includes natural rubber, butadiene rubber, non-functionalized synthetic rubbers or any combination thereof. Non-limiting examples of such non-functionalized synthetic rubbers include one or more polyene homo- and copolymers (e.g., polybutadiene, polyisoprene, and copolymers incorporating butadiene, isoprene, and the like), butyl rubber, neoprene, ethylene-propylene rubber, ethylene-propylene-diene monomer, nitrile rubber, silicone rubber, fluoroelastomers, ethylene-acrylic rubber, ethylene-vinyl acetate rubber, epichlorohydrin rubbers, chlorinated polyethylene rubbers, chlorosulfonated polyethylene rubbers, hydrogenated nitrile rubber, tetrafluoroethylene-propylene rubber, and the like.

Embodiments of rubber compositions and tire components disclosed herein will generally contain from 15 to 45 phr of the rubber component. In one or more embodiments, the rubber compositions and tire components will contain from 20 to 40 phr, from 25 to 35 phr, or from 28 to 32 phr of the rubber component.

In one or more embodiments, the styrene-butadiene copolymers have gradients in styrene and block styrene content. In one embodiment, the styrene-butadiene copolymers have total styrene contents of 10 to 50 percent by weight of the styrene-butadiene copolymer. In other embodiments, the styrene-butadiene copolymers have total styrene contents of 18 to 47, 22 to 45, or 30 to 43 percent by weight of the styrene-butadiene copolymer.

In one or more embodiments, the styrene-butadiene copolymers have a content of styrene sequences having greater than three styrene units of greater than 5 weight percent of the styrene-butadiene copolymer. In other embodiments, the styrene-butadiene copolymers have a content of styrene sequences having greater than three styrene units of greater than 8, 10, 13, 18, 20, 25, 30, 40, or 50 weight percent of the styrene-butadiene copolymer. In further embodiments, the styrene-butadiene copolymers have a content of styrene sequences having greater than three styrene units of 15 to 30 weight percent of the styrene-butadiene copolymer. In one or more embodiments, the three or more styrene units in the styrene-butadiene copolymers can be consecutive units, for example, three consecutive styrene units at any position in the styrene-butadiene copolymers.

In one or more embodiments, the number average molecular weight ($M_n$) of the styrene-butadiene copolymers can be from or 90 to 290 kg/mol, 100 to 280 kg/mol, 110 to 270 kg/mol, or 120 to 260 kg/mol as determined using gel permeation chromatography calibrated with polystyrene standards and Mark-Houwink constants for the styrene-butadiene polymer. In one or more embodiments, the weight average molecular weight ($M_w$) of the styrene-butadiene copolymers can be from 100 to 320 kg/mol, 110 to 310 kg/mol, 120 to 300 kg/mol, or 130 to 290 kg/mol as determined by using gel permeation chromatography calibrated with polystyrene standards and Mark-Houwink constants for the styrene-butadiene polymer. In one or more embodiments, the molecular weight distribution or polydispersity ($M_w/M_n$) of the styrene-butadiene copolymers can be less than 2, less than 1.9, less than 1.6, less than 1.5, less than 1.3, less than 1.1, less than 1, or less than 0.9.

In one or more embodiments, the glass transition temperature ($T_g$) of the styrene-butadiene copolymers can be from $-90°$ C. to $-20°$ C. In other embodiments, the $T_g$ of the styrene-butadiene copolymers can be from $-85°$ C. to $-25°$ C., $-75°$ C. to $-35°$ C., or $-65°$ C. to $-45°$ C.

Embodiments of rubber compositions and tire components that contain the disclosed styrene-butadiene copolymer will generally contain from 50 to 90 phr. In one or more embodiments, the rubber compositions and tire components will contain from 60 to 80 phr, from 65 to 75 phr, or from 68 to 72 phr of the styrene-butadiene copolymer.

In one or more embodiments, the aromatic-compound based resin contains carbon-to-carbon unsaturation (double bonds) and can be a mixture of aromatic and acyclic polymer moieties, which may be referred to as "aromatic-compound based resins." In one or more embodiments, the aromatic-compound based resin has a softening point within a range from $65°$ C. to $155°$ C., $75°$ C. to $145°$ C., or $85°$ C. to $135°$ C. In one or more embodiments, the aromatic-compound based resin includes one or more coumarone indene resins, one or more alkyl aromatic resins, or any combination thereof. Representative of a coumarone indene resin with a softening point of $130°$ C. is Cumar® 130 from Neville Chemical Company. Representative of an alkyl aromatic resin with a softening point of $85°$ C. is Impera™ P1504 from Eastman Chemical Company.

Embodiments of rubber compositions and tire components that contain the disclosed aromatic-compound based resins will general contain 10 to 30 phr of the aromatic-compound based resin. In one or more embodiments, the rubber compositions and tire components will contain 15 to 25 phr, 17 to 23 phr, or 19 to 21 phr of the aromatic-compound based resin. The tan δ of the rubber compositions measured at $0°$ C. can be in the range of 0.4 to 0.8, 0.45 to 0.75, 0.5 to 0.7 or 0.6. In one or more embodiments, the tan δ of the rubber compositions measured at $0°$ C. can be at least 20, 30, 40, 50, 60, 70, 80 or 85 percent higher than the tan δ measured at $0°$ C. for the same rubber composition having no aromatic-compound based resin.

Rubber compositions that include embodiments of the disclosed aromatic-compound based resins and styrene-butadiene copolymers can be cured in a conventional manner with known vulcanizing agents. For example, sulfur or peroxide-based curing systems may be employed. Also, see Kirk-Othmer, ENCYCLOPEDIA OF CHEMICAL TECHNOLOGY, $3^{rd}$ Edition, Wiley Interscience, N.Y. 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, 2nd Edition, John Wiley & Sons, Inc., 1989, which are incorporated herein by reference. Vulcanizing agents may be used alone or in combination.

The rubber compositions and tire components may also include other compounding additives such as accelerators, oils, waxes, scorch inhibiting agents, and processing aids. Compositions containing synthetic rubbers can include antidegradants, processing oils, zinc oxide, optional tackifying resins, optional reinforcing resins, optional fatty acids, optional peptizers, and optional scorch inhibiting agents. The use of the disclosed aromatic-compound based resins and styrene-butadiene copolymers can reduce or eliminate the need for ingredients such as processing oils. Accordingly, the rubber compositions of certain disclosed embodiments may be essentially devoid of processing oils, where "essentially devoid" refers to the absence of any amount that is conventionally required to impact compounding and curing. In one or more embodiments, the rubber compositions can include less than 5 phr, 3 phr, 2, phr, 1 phr, 0.5 phr, 0.1 or 0 phr of processing oils.

Fillers, such as carbon black, silica, or aluminum hydroxide, are typically employed in an amount from 1 to 150 phr, and preferably from 20 to 130 phr, and more preferably from 30 to 100 phr.

Silica may optionally be used in an amount from 0.5 to 100 phr, preferably from 15 to 90 phr, and more preferably from 20 to 80 phr.

Carbon black may optionally be used in an amount from 0.5 to 80 phr, preferably from 1 to 70 phr, and more preferably from 10 to 60 phr.

Aluminum hydroxide may optionally be used in an amount from 1 to 25 phr, preferably from 2 to 20 phr, and more preferably from 5 to 15 phr.

Tire formulations are compounded by using mixing equipment and procedures conventionally employed in the art. Preferably, an initial masterbatch is prepared that includes the elastomer components and the reinforcing fillers, as well as other optional additives such as processing oil and antioxidants. Embodiments of the aromatic-compound based resin and styrene-butadiene copolymer are preferably added during preparation of the initial masterbatch. Once this initial masterbatch is prepared, the vulcanizing agents are blended into the composition. Rubber compounding techniques and the additives employed therein are generally known as disclosed in The Compounding and Vulcanization of Rubber, by Stevens in RUBBER TECHNOLOGY SECOND EDITION (1973 Van Nostrand Reihold Company). The mixing conditions and procedures applicable to tire formulations are also well known as described in U.S. Pat. Nos. 5,227,425, 5,719,207, 5,717,022, as well as EP 0890606, all of which are incorporated herein by reference. The composition can then be processed into tire components according to ordinary tire manufacturing techniques including standard rubber curing techniques. Tire compositions containing embodiments of the disclosed aromatic-compound based resins and styrene-butadiene copolymer preferably include tire treads or a component of the tire tread. For example, the compositions can be used to form other elastomeric tire components such as tread caps, subtreads, black sidewalls, body ply skims, bead fillers and the like. Pneumatic tires can be made according to U.S. Pat. Nos. 5,866,171, 5,876,527, 5,931,211, and 5,971,046, which are incorporated herein by reference.

The aromatic-compound based resins and styrene-butadiene copolymers of this disclosure are particularly useful in preparing rubber compositions that can be used to manufacture tire components. Rubber compounding techniques and the additives employed therein are generally disclosed in The Compounding and Vulcanization of Rubber, in Rubber Technology (2nd Ed. 1973).

Examples

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., functionalizing agent, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

Rubber compositions were prepared in accordance with the formulations shown in Tables 3-10 by kneading the components using a 65 gram BRABENDER tangential mixer. The obtained rubber compositions were vulcanized at 160° C. for 12 minutes, and the tan δ at 0° C. of the obtained vulcanizates were measured. The results are shown in Tables 3-10. A larger index value indicates improved wet traction.

Seven styrene-butadiene copolymers (SBR1-SBR7) and six resins evaluated in the formulations are summarized in Tables 1 and 2, respectively. Comparative Samples A-1 through H-1 in Tables 3-10 each contained black oil (petroleum hydrocarbon mixture) and served as Controls.

TABLE 1

|  | SBR1 | SBR2 | SBR3 | SBR4 | SBR5 | SBR6 | SBR7 |
| --- | --- | --- | --- | --- | --- | --- | --- |
| Vinyl (%)* | 41.9 | 20.2 | 20.1 | 11.1 | 45.0 | 28.6 | 39.2 |
| Styrene (%)* | 18.2 | 29.9 | 36.0 | 40.6 | 20.2 | 23.1 | 10.0 |
| Styrene in sequences containing three or more styrene units (%)* | 1.4 | 13.6 | 18.5 | 25.6 | 0.3 | 9.0 | 0.6 |
| $T_g$ (° C.) | −49.7 | −56.4 | −49.9 | −62.5 | −33.4 | −59.2 | −62.5 |
| $M_n$ (kg/mol) | 132.5 | 120.5 | 126.0 | 251.6 | 199.9 | 179.4 | 206.2 |
| $M_w$ (kg/mol) | 141.5 | 136.5 | 139.0 | 275.9 | 212.4 | 196.5 | 220.1 |
| $M_w/M_n$ | 1.07 | 1.13 | 1.10 | 1.10 | 1.10 | 1.10 | 1.10 |

*Percent by weight of the styrene-butadiene copolymer.

TABLE 2

| Resin Type | Softening Point (° C.) | Example | Manufacturer |
|---|---|---|---|
| Modified C5 | 87 | Wingtack ® 86 | Cray Valley |
| DCPD (C5/C9) | 105 | LX ®-1055 | Neville Chemical Company |
| Aromatic/cycloaliphatic | 113 | Picco ™ 2215 | Eastman Chemical Company |
| α-pinene | 122-128 | Piccolyte ® A125 | Pinova, Inc. |
| Coumarone indene based | 130 | Cumar ® 130 | Neville Chemical Company |
| Alkyl aromatic based | 85 | Impera ™ P1504 | Eastman Chemical Company |

In the following examples, the number average ($M_n$) and weight average ($M_w$) molecular weights of the polymer samples were determined by gel permeation chromatography. The gel permeation chromatography instrument was equipped with a differential refractive index detector and an ultraviolet absorption detector.

The styrene contents of the polymer samples were determined using Fourier transform infrared spectroscopy, $^1$H-NMR spectroscopy (CDCl$_3$), or by $^{13}$C-NMR spectroscopy. The $^1$H- and $^{13}$C-NMR measurements were made on a 300 MHz Gemini 300 NMR Spectrometer System (Varian).

The glass transition temperature ($T_g$) was determined using a DSC 2910 Differential Scanning calorimeter (TA Instruments). The $T_g$ was determined as the temperature where an inflection point occurred in the heat capacity ($C_p$) change.

Tan δ was obtained using an ARES-G2 analytical instrument made by TA Instruments at 0° C., 2% strain and 10 Hz.

TABLE 3

| | Comparative Sample A-1 | Sample A-2 | Sample A-3 | Sample A-4 | Sample A-5 | Sample A-6 | Sample A-7 |
|---|---|---|---|---|---|---|---|
| Master Batch | | | | | | | |
| SBR1 | 70 | 70 | 70 | 70 | 70 | 70 | 70 |
| Butadiene rubber, high cis | 30 | 30 | 30 | 30 | 30 | 30 | 30 |
| Carbon black | 50 | 50 | 50 | 50 | 50 | 50 | 50 |
| Black oil (petroleum hydrocarbon mixture) | 20 | 0 | 0 | 0 | 0 | 0 | 0 |
| Modified C5 resin | 0 | 20 | 0 | 0 | 0 | 0 | 0 |
| DCPD (C5/C9) resin | 0 | 0 | 20 | 0 | 0 | 0 | 0 |
| Aromatic/cycloaliphatic resin | 0 | 0 | 0 | 20 | 0 | 0 | 0 |
| α-pinene resin | 0 | 0 | 0 | 0 | 20 | 0 | 0 |
| Coumarone indene resin | 0 | 0 | 0 | 0 | 0 | 20 | 0 |
| Alkyl aromatic resin | 0 | 0 | 0 | 0 | 0 | 0 | 20 |
| Stearic acid | 2 | 2 | 2 | 2 | 2 | 2 | 2 |
| Microcrystalline wax blend | 2 | 2 | 2 | 2 | 2 | 2 | 2 |
| N-(1,3-dimethylbutyl)-N'-phenyl-p-phenylenediamine | 0.95 | 0.95 | 0.95 | 0.95 | 0.95 | 0.95 | 0.95 |
| Final Batch | | | | | | | |
| Sulfur | 1.5 | 1.5 | 1.5 | 1.5 | 1.5 | 1.5 | 1.5 |
| N-tert-butyl-2-benzothiazyl sulfonamide | 0.5 | 0.5 | 0.5 | 0.5 | 0.5 | 0.5 | 0.5 |
| Benzothiazyl disulfide | 0.5 | 0.5 | 0.5 | 0.5 | 0.5 | 0.5 | 0.5 |
| Diphenylguanidine | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 |
| Tan δ measured at 0° C. | 0.237 | 0.252 | 0.245 | 0.237 | 0.280 | 0.260 | 0.267 |
| Wet traction index | 100 | 106 | 103 | 100 | 118 | 110 | 113 |

SBR1 includes 1.4% by weight of styrene sequences containing three or more styrene units. As can be seen in Table 3, use of the aromatic-compound based resins in rubber compositions that include SBR1 and high-cis butadiene rubber resulted in improvements in wet traction ranging from 10 to 13%. The incorporation of a coumarone indene resin and an alkyl aromatic resin increased the wet traction by 10 and 13%, respectively. In comparison, the incorporation of a modified C5 resin, a DCPD (C5/C9) resin, an aromatic/cycloaliphatic resin, and an α-pinene resin increased the wet traction by 6, 3, 0, and 18%, respectively.

TABLE 4

|  | Comparative Sample B-1 | Sample B-2 | Sample B-3 | Sample B-4 | Sample B-5 | Sample B-6 | Sample B-7 |
|---|---|---|---|---|---|---|---|
| Master Batch |  |  |  |  |  |  |  |
| SBR2 | 70 | 70 | 70 | 70 | 70 | 70 | 70 |
| Butadiene rubber, high cis | 30 | 30 | 30 | 30 | 30 | 30 | 30 |
| Carbon black | 50 | 50 | 50 | 50 | 50 | 50 | 50 |
| Black oil (petroleum hydrocarbon mixture) | 20 | 0 | 0 | 0 | 0 | 0 | 0 |
| Modified C5 resin | 0 | 20 | 0 | 0 | 0 | 0 | 0 |
| DCPD (C5/C9) resin | 0 | 0 | 20 | 0 | 0 | 0 | 0 |
| Aromatic/cycloaliphatic resin | 0 | 0 | 0 | 20 | 0 | 0 | 0 |
| α-pinene resin | 0 | 0 | 0 | 0 | 20 | 0 | 0 |
| Coumarone indene resin | 0 | 0 | 0 | 0 | 0 | 20 | 0 |
| Alkyl aromatic resin | 0 | 0 | 0 | 0 | 0 | 0 | 20 |
| Stearic acid | 2 | 2 | 2 | 2 | 2 | 2 | 2 |
| Microcrystalline wax blend | 2 | 2 | 2 | 2 | 2 | 2 | 2 |
| N-(1,3-dimethylbutyl)-N'-phenyl-p-phenylenediamine | 0.95 | 0.95 | 0.95 | 0.95 | 0.95 | 0.95 | 0.95 |
| Final Batch |  |  |  |  |  |  |  |
| Sulfur | 1.5 | 1.5 | 1.5 | 1.5 | 1.5 | 1.5 | 1.5 |
| N-tert-butyl-2-benzothiazyl sulfonamide | 0.5 | 0.5 | 0.5 | 0.5 | 0.5 | 0.5 | 0.5 |
| Benzothiazyl disulfide | 0.5 | 0.5 | 0.5 | 0.5 | 0.5 | 0.5 | 0.5 |
| Diphenylguanidine | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 |
| Tan δ measured at 0° C. | 0.268 | 0.296 | 0.253 | 0.279 | 0.307 | 0.312 | 0.311 |
| Wet traction index | 100 | 111 | 94 | 104 | 115 | 116 | 116 |

SBR2 includes 13.6% by weight of styrene sequences containing three or more styrene units. As can be seen in Table 4, use of the aromatic-compound based resins in rubber compositions that include SBR2 and high-cis butadiene rubber resulted in improvements in wet traction of 16%, for example, by incorporating a coumarone indene resin or alkyl aromatic resin. The tan δ measured at 0° C. for the rubber compositions was above 0.3 with the incorporation of an aromatic-compound based resin. For example, the tan δ measured at 0° C. for the rubber compositions was above 0.31 when either a coumarone indene resin or alkyl aromatic resin was used. In comparison, the incorporation of a modified C5 resin, a DCPD (C5/C9) resin, an aromatic/cycloaliphatic resin, and an α-pinene resin changed the wet traction by 11, −6, 4, and 15%, respectively.

TABLE 5

|  | Comparative Sample C-1 | Sample C-2 | Sample C-3 | Sample C-4 | Sample C-5 | Sample C-6 | Sample C-7 |
|---|---|---|---|---|---|---|---|
| Master Batch |  |  |  |  |  |  |  |
| SBR3 | 70 | 70 | 70 | 70 | 70 | 70 | 70 |
| Butadiene rubber, high cis | 30 | 30 | 30 | 30 | 30 | 30 | 30 |
| Carbon black | 50 | 50 | 50 | 50 | 50 | 50 | 50 |
| Black oil (petroleum hydrocarbon mixture) | 20 | 0 | 0 | 0 | 0 | 0 | 0 |

TABLE 5-continued

|  | Comparative Sample C-1 | Sample C-2 | Sample C-3 | Sample C-4 | Sample C-5 | Sample C-6 | Sample C-7 |
|---|---|---|---|---|---|---|---|
| Modified C5 resin | 0 | 20 | 0 | 0 | 0 | 0 | 0 |
| DCPD (C5/C9) resin | 0 | 0 | 20 | 0 | 0 | 0 | 0 |
| Aromatic/cycloaliphatic resin | 0 | 0 | 0 | 20 | 0 | 0 | 0 |
| α-pinene resin | 0 | 0 | 0 | 0 | 20 | 0 | 0 |
| Coumarone indene resin | 0 | 0 | 0 | 0 | 0 | 20 | 0 |
| Alkyl aromatic resin | 0 | 0 | 0 | 0 | 0 | 0 | 20 |
| Stearic acid | 2 | 2 | 2 | 2 | 2 | 2 | 2 |
| Microcrystalline wax blend | 2 | 2 | 2 | 2 | 2 | 2 | 2 |
| N-(1,3-dimethylbutyl)-N'-phenyl-p-phenylenediamine | 0.95 | 0.95 | 0.95 | 0.95 | 0.95 | 0.95 | 0.95 |
| Final Batch |  |  |  |  |  |  |  |
| Sulfur | 1.5 | 1.5 | 1.5 | 1.5 | 1.5 | 1.5 | 1.5 |
| N-tert-butyl-2-benzothiazyl sulfonamide | 0.5 | 0.5 | 0.5 | 0.5 | 0.5 | 0.5 | 0.5 |
| Benzothiazyl disulfide | 0.5 | 0.5 | 0.5 | 0.5 | 0.5 | 0.5 | 0.5 |
| Diphenylguanidine | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 |
| Tan δ measured at 0° C. | 0.310 | 0.379 | 0.349 | 0.357 | 0.381 | 0.452 | 0.458 |
| Wet traction index | 100 | 122 | 113 | 115 | 123 | 146 | 148 |

SBR3 includes 18.5% by weight of styrene sequences containing three or more styrene units. As can be seen in Table 5, use of the aromatic-compound based resins in rubber compositions that include SBR3 and high-cis butadiene rubber resulted in improvements in wet traction ranging from 46 to 48%, for example, by incorporating a coumarone indene resin and alkyl aromatic resin, respectively. The tan δ measured at 0° C. for the rubber compositions was above 0.4 with the incorporation of an aromatic-compound based resin. For example, the tan δ measured at 0° C. for the rubber compositions was above 0.45 when either a coumarone indene resin or alkyl aromatic resin was used, which is an increase of greater than 45 percent as compared to the same rubber composition with other types of resin. The incorporation of a modified C5 resin, a DCPD (C5/C9) resin, an aromatic/cycloaliphatic resin, and an α-pinene resin increased the wet traction by 22, 13, 15, and 23%, respectively.

TABLE 6

|  | Comparative Sample D-1 | Sample D-2 | Sample D-3 | Sample D-4 | Sample D-5 | Sample D-6 | Sample D-7 |
|---|---|---|---|---|---|---|---|
| Master Batch |  |  |  |  |  |  |  |
| SBR4 | 70 | 70 | 70 | 70 | 70 | 70 | 70 |
| Butadiene rubber, high cis | 30 | 30 | 30 | 30 | 30 | 30 | 30 |
| Carbon black | 50 | 50 | 50 | 50 | 50 | 50 | 50 |
| Black oil (petroleum hydrocarbon mixture) | 20 | 0 | 0 | 0 | 0 | 0 | 0 |
| Modified C5 resin | 0 | 20 | 0 | 0 | 0 | 0 | 0 |
| DCPD (C5/C9) resin | 0 | 0 | 20 | 0 | 0 | 0 | 0 |
| Aromatic/cycloaliphatic resin | 0 | 0 | 0 | 20 | 0 | 0 | 0 |
| α-pinene resin | 0 | 0 | 0 | 0 | 20 | 0 | 0 |
| Coumarone indene resin | 0 | 0 | 0 | 0 | 0 | 20 | 0 |
| Alkyl aromatic resin | 0 | 0 | 0 | 0 | 0 | 0 | 20 |
| Stearic acid | 2 | 2 | 2 | 2 | 2 | 2 | 2 |
| Microcrystalline wax blend | 2 | 2 | 2 | 2 | 2 | 2 | 2 |
| N-(1,3-dimethylbutyl)-N'-phenyl-p-phenylenediamine | 0.95 | 0.95 | 0.95 | 0.95 | 0.95 | 0.95 | 0.95 |
| Final Batch |  |  |  |  |  |  |  |
| Sulfur | 1.5 | 1.5 | 1.5 | 1.5 | 1.5 | 1.5 | 1.5 |
| N-tert-butyl-2-benzothiazyl sulfonamide | 0.5 | 0.5 | 0.5 | 0.5 | 0.5 | 0.5 | 0.5 |

TABLE 6-continued

|  | Comparative Sample D-1 | Sample D-2 | Sample D-3 | Sample D-4 | Sample D-5 | Sample D-6 | Sample D-7 |
|---|---|---|---|---|---|---|---|
| Benzothiazyl disulfide | 0.5 | 0.5 | 0.5 | 0.5 | 0.5 | 0.5 | 0.5 |
| Diphenylguanidine | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 |
| Tan δ measured at 0° C. | 0.360 | 0.494 | 0.492 | 0.457 | 0.531 | 0.618 | 0.633 |
| Wet traction index | 100 | 137 | 137 | 127 | 147 | 172 | 176 |

SBR4 includes 25.6% by weight of styrene sequences containing three or more styrene units. As can be seen in Table 6, use of the aromatic-compound based resins in rubber compositions that include SBR4 and high-cis butadiene rubber resulted in improvements in wet traction ranging from 72 to 76%. The tan δ measured at 0° C. for the rubber compositions was above 0.4, 0.5 and 0.6 with the incorporation of an aromatic-compound based resin. For example, the tan δ measured at 0° C. for the rubber compositions was above 0.6 when either a coumarone indene resin or alkyl aromatic resin was used, which is an increase of greater than 65 percent as compared to the same rubber composition with other types of resin. The incorporation of a modified C5 resin, a DCPD (C5/C9) resin, an aromatic/cycloaliphatic resin, and an α-pinene resin increased the wet traction by 37, 37, 27, and 47%, respectively.

TABLE 7

|  | Comparative Sample E-1 | Sample E-2 | Sample E-3 |
|---|---|---|---|
| Master Batch |  |  |  |
| SBR4 | 70 | 70 | 70 |
| Natural rubber | 30 | 30 | 30 |
| Carbon black | 50 | 50 | 50 |
| Black oil (petroleum hydrocarbon mixture) | 20 | 0 | 0 |
| α-pinene resin | 0 | 20 | 0 |
| Alkyl aromatic resin | 0 | 0 | 20 |
| Stearic acid | 2 | 2 | 2 |
| Microcrystalline wax blend | 2 | 2 | 2 |
| N-(1,3-dimethylbutyl)-N'-phenyl-p-phenylenediamine | 0.95 | 0.95 | 0.95 |
| Final Batch |  |  |  |
| Sulfur | 1.5 | 1.5 | 1.5 |
| N-tert-butyl-2-benzothiazyl sulfonamide | 0.5 | 0.5 | 0.5 |
| Benzothiazyl disulfide | 0.5 | 0.5 | 0.5 |
| Diphenylguanidine | 0.3 | 0.3 | 0.3 |
| Zinc oxide | 2.5 | 2.5 | 2.5 |
| Tan δ measured at 0° C. | 0.414 | 0.605 | 0.766 |
| Wet traction index | 100 | 146 | 185 |

SBR4 includes 25.6% by weight of styrene sequences containing three or more styrene units. As can be seen in Table 7, use of an alkyl aromatic resin in rubber compositions that include SBR4 and natural rubber resulted in improving wet traction by 85%. The tan δ measured at 0° C. for the rubber compositions was above 0.7 with the incorporation of an aromatic-compound based resin. For example, the tan δ measured at 0° C. for the rubber compositions was above 0.75 when an alkyl aromatic resin was used, which is an increase of greater than 85 percent as compared to the same rubber composition with no aromatic-compound resin. The incorporation of an α-pinene resin increased the wet traction by 46%.

TABLE 8

|  | Comparative Sample F-1 | Sample F-2 | Sample F-3 |
|---|---|---|---|
| Master Batch |  |  |  |
| SBR5 | 70 | 70 | 70 |
| Natural rubber | 30 | 30 | 30 |
| Carbon black | 50 | 50 | 50 |
| Black oil (petroleum hydrocarbon mixture) | 20 | 0 | 0 |
| α-pinene resin | 0 | 20 | 0 |
| Alkyl aromatic resin | 0 | 0 | 20 |
| Stearic acid | 2 | 2 | 2 |
| Microcrystalline wax blend | 2 | 2 | 2 |
| N-(1,3-dimethylbutyl)-N'-phenyl-p-phenylenediamine | 0.95 | 0.95 | 0.95 |
| Final Batch |  |  |  |
| Sulfur | 1.5 | 1.5 | 1.5 |
| N-tert-butyl-2-benzothiazyl sulfonamide | 0.5 | 0.5 | 0.5 |
| Benzothiazyl disulfide | 0.5 | 0.5 | 0.5 |
| Diphenylguanidine | 0.3 | 0.3 | 0.3 |
| Zinc oxide | 2.5 | 2.5 | 2.5 |
| Tan δ measured at 0° C. | 0.374 | 0.636 | 0.653 |
| Wet traction index | 100 | 170 | 175 |

SBR5 includes 0.3% by weight of styrene sequences containing three or more styrene units. As can be seen in Table 8, use of an alkyl aromatic resin in rubber compositions that include SBR5 and natural rubber resulted in improving wet traction by 75%. The tan δ measured at 0° C. for the rubber compositions was above 0.6 with the incorporation of an aromatic-compound based resin. For example, the tan δ measured at 0° C. for the rubber compositions was above 0.65 when an alkyl aromatic resin was used, which is an increase of greater than 74 percent. The incorporation of an α-pinene resin increased the wet traction by 70%.

TABLE 9

|  | Comparative Sample G-1 | Sample G-2 | Sample G-3 |
|---|---|---|---|
| Master Batch |  |  |  |
| SBR6 | 70 | 70 | 70 |
| Natural rubber | 30 | 30 | 30 |
| Carbon black | 50 | 50 | 50 |
| Black oil (petroleum hydrocarbon mixture) | 20 | 0 | 0 |
| α-pinene resin | 0 | 20 | 0 |
| Alkyl aromatic resin | 0 | 0 | 20 |
| Stearic acid | 2 | 2 | 2 |
| Microcrystalline wax blend | 2 | 2 | 2 |
| N-(1,3-dimethylbutyl)-N'-phenyl-p-phenylenediamine | 0.95 | 0.95 | 0.95 |

TABLE 9-continued

|  | Comparative Sample G-1 | Sample G-2 | Sample G-3 |
|---|---|---|---|
| Final Batch |  |  |  |
| Sulfur | 1.5 | 1.5 | 1.5 |
| N-tert-butyl-2-benzothiazyl sulfonamide | 0.5 | 0.5 | 0.5 |
| Benzothiazyl disulfide | 0.5 | 0.5 | 0.5 |
| Diphenylguanidine | 0.3 | 0.3 | 0.3 |
| Zinc oxide | 2.5 | 2.5 | 2.5 |
| Tan δ measured at 0° C. | 0.262 | 0.337 | 0.369 |
| Wet traction index | 100 | 129 | 141 |

SBR6 includes 9.0% by weight of styrene sequences containing three or more styrene units. As can be seen in Table 9, use of an alkyl aromatic resin in rubber compositions that include SBR6 and natural rubber resulted in improving wet traction by 41%. The tan δ measured at 0° C. for the rubber compositions was above 0.35 with the incorporation of an aromatic-compound based resin. For example, the tan δ measured at 0° C. for the rubber compositions was above 0.36 when an alkyl aromatic resin was used, which is an increase of greater than 40 percent as compared to the same rubber composition with no aromatic-compound resin. The incorporation of an α-pinene resin increased the wet traction by 29%.

TABLE 10

|  | Comparative Sample H-1 | Sample H-2 | Sample H-3 |
|---|---|---|---|
| Master Batch |  |  |  |
| SBR7 | 70 | 70 | 70 |
| Natural rubber | 30 | 30 | 30 |
| Carbon black | 50 | 50 | 50 |
| Black oil (petroleum hydrocarbon mixture) | 20 | 0 | 0 |
| α-pinene resin | 0 | 20 | 0 |
| Alkyl aromatic resin | 0 | 0 | 20 |
| Stearic acid | 2 | 2 | 2 |
| Microcrystalline wax blend | 2 | 2 | 2 |
| N-(1,3-dimethylbutyl)-N'-phenyl-p-phenylenediamine | 0.95 | 0.95 | 0.95 |
| Final Batch |  |  |  |
| Sulfur | 1.5 | 1.5 | 1.5 |
| N-tert-butyl-2-benzothiazyl sulfonamide | 0.5 | 0.5 | 0.5 |
| Benzothiazyl disulfide | 0.5 | 0.5 | 0.5 |
| Diphenylguanidine | 0.3 | 0.3 | 0.3 |
| Zinc oxide | 2.5 | 2.5 | 2.5 |
| Tan δ measured at 0° C. | 0.232 | 0.278 | 0.280 |
| Wet traction index | 100 | 120 | 121 |

SBR7 includes 0.6% by weight of styrene sequences containing three or more styrene units. As can be seen in Table 10, use of an alkyl aromatic resin in rubber compositions that include SBR7 and natural rubber resulted in improving wet traction by 21%. The tan δ measured at 0° C. for the rubber compositions was above 0.28 with the incorporation of an aromatic-compound based resin. For example, the tan δ measured at 0° C. for the rubber compositions was above 0.28 when an alkyl aromatic resin was used, which is an increase of greater than 20 percent. The incorporation of an α-pinene resin increased the wet traction by 20%.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A rubber composition for a tire comprising:
   a rubber component;
   a styrene-butadiene copolymer comprising:
      a total styrene content of 18 to 45 percent by weight of the styrene-butadiene copolymer; and
      a content of styrene sequences having three or more styrene units is 15-30 weight percent of the styrene-butadiene copolymer; and
   10 to 30 phr of an aromatic-compound based resin;
   wherein the rubber composition has a tan δ measured at 0° C. of 0.4 to 0.8.

2. The rubber composition of claim 1, the aromatic-compound based resin being a coumarone indene resin.

3. The rubber composition of claim 1, the aromatic-compound based resin being an alkyl aromatic resin.

4. The rubber composition of claim 1, the total styrene content is 30 to 43 percent by weight of the styrene-butadiene copolymer.

5. The rubber composition of claim 1, the rubber composition is substantially free of a process oil.

6. A rubber composition for a tire comprising:
   a rubber component;
   a styrene-butadiene copolymer comprising:
      a total styrene content of 18 to 45 percent by weight of the styrene-butadiene copolymer; and
      a content of styrene sequences having three or more styrene units is 15-30 weight percent of the styrene-butadiene copolymer; and
   15 to 25 phr of (i) a coumarone indene resin or (ii) an alkyl aromatic resin;
   wherein the rubber composition has a tan δ measured at 0° C. of 0.4 to 0.8.

7. The rubber composition of claim 6, the total styrene content is 30 to 43 percent by weight of the styrene-butadiene copolymer.

8. The rubber composition of claim 6, wherein the rubber composition is substantially free of a process oil.

9. A first rubber composition for a tire comprising:
   a rubber component;
   a styrene-butadiene copolymer comprising:
      a total styrene content of 18 to 45 percent by weight of the styrene-butadiene copolymer; and
   10 to 30 phr of an aromatic-compound based resin, the aromatic-compound based resin being selected from the group consisting of a coumarone indene resin, an alkyl aromatic resin, and a combination thereof,
   wherein the first rubber composition has a wet-traction index based on tan δ measured at 0° C. at least 20% greater than a wet-traction index based on tan δ measured at 0° C. of a second rubber composition having the same composition as the first rubber composition except the aromatic-compound based resin is replaced with a process oil.

10. The first rubber composition of claim 9, wherein the wet-traction index based on tan δ measured at 0° C. of the first rubber composition is at least 30% greater than the wet-traction index based on tan δ measured at 0° C. of the second rubber composition.

11. The first rubber composition of claim 9, the styrene-butadiene copolymer comprising a content of styrene sequences having three or more styrene units greater than 8 weight percent of the styrene-butadiene copolymer.

12. The first rubber composition of claim 11, the content of styrene sequences having three or more styrene units is 15 to 30 weight percent of the styrene-butadiene copolymer.

13. The first rubber composition of claim 9, the aromatic-compound based resin being a coumarone indene resin.

14. The first rubber composition of claim 9, the aromatic-compound based resin being an alkyl aromatic resin.

15. The first rubber composition of claim 9, the aromatic-compound based resin being a combination of a coumarone indene resin and an alkyl aromatic resin.

16. The first rubber composition of claim 9, the process oil of the second rubber composition being a petroleum hydrocarbon mixture.

17. The first rubber composition of claim 9, the total styrene content is 30 to 43 percent by weight of the styrene-butadiene copolymer.

18. The first rubber composition of claim 9, the rubber component comprises a butadiene rubber and a natural rubber.

\* \* \* \* \*